(12) United States Patent
Hartwich (10) Patent No.: US 9,137,037 B2
(45) Date of Patent: *Sep. 15, 2015

(54) METHOD FOR TRANSMITTING DATA AMONG SUBSCRIBER STATIONS OF A BUS SYSTEM

(75) Inventor: Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 277 days.

This patent is subject to a terminal disclaimer.

(21) Appl. No.: 13/378,953

(22) PCT Filed: Jun. 11, 2010

(86) PCT No.: PCT/EP2010/058247

§ 371 (c)(1),
(2), (4) Date: Mar. 14, 2012

(87) PCT Pub. No.: WO2010/146002

PCT Pub. Date: Dec. 23, 2010

(65) Prior Publication Data

US 2012/0163400 A1  Jun. 28, 2012

(30) Foreign Application Priority Data

Jun. 16, 2009 (DE) .......................... 10 2009 026 961

(51) Int. Cl.

| | |
|---|---|
| *H04L 12/28* | (2006.01) |
| *H04L 12/40* | (2006.01) |
| *H04L 12/413* | (2006.01) |
| *H04L 12/417* | (2006.01) |
| *H04L 12/707* | (2013.01) |
| *H04L 12/803* | (2013.01) |

(52) U.S. Cl.
CPC ........ *H04L 12/40169* (2013.01); *H04L 12/417* (2013.01); *H04L 12/4135* (2013.01); *H04L 45/24* (2013.01); *H04L 47/125* (2013.01); *H04L 2012/40215* (2013.01)

(58) Field of Classification Search
CPC ........................................................ H04L 12/66
USPC .................................................. 370/423–464
See application file for complete search history.

(56) References Cited

U.S. PATENT DOCUMENTS

| | | | | |
|---|---|---|---|---|
| 5,600,782 | A | * | 2/1997 | Thomson .................... 714/4.21 |
| 5,895,483 | A | * | 4/1999 | Mori ............................. 711/114 |
| 7,062,610 | B2 | * | 6/2006 | Conway ........................ 711/141 |
| 2003/0224784 | A1 | * | 12/2003 | Hunt et al. ................. 455/426.2 |
| 2010/0080243 | A1 | * | 4/2010 | Barrenscheen ............... 370/464 |

FOREIGN PATENT DOCUMENTS

| | | |
|---|---|---|
| CN | 1692034 | 11/2005 |
| CN | 1792052 | 6/2006 |
| CN | 1922827 | 2/2007 |
| DE | 10301637 | 7/2004 |
| WO | WO2004/067328 | 8/2004 |
| WO | WO 2004/105278 | 12/2004 |
| WO | WO 2005/081463 | 9/2005 |

OTHER PUBLICATIONS

International Search Report, PCT International Application No. PCT/EP2010/058247, dated Jul. 16, 2010.

* cited by examiner

*Primary Examiner* — Iqbal Zaidi
(74) *Attorney, Agent, or Firm* — Kenyon & Kenyon LLP (57) ABSTRACT

A method for transmitting data among subscriber stations of a bus system over a first channel of the bus system that is jointly used by a plurality of subscriber stations. To provide a method for the access by a subscriber station of the bus channel to a second channel of the bus system in parallel to a first channel that is jointly used by a plurality of subscriber stations; besides over the first channel, data are also transmitted over a second channel that is used by a plurality of subscriber stations, the access to the second channel being controlled by any given access method, and first data to be transmitted over the first channel and second data to be transmitted over the second channel being transmitted over a shared signal line.

10 Claims, 5 Drawing Sheets

METHOD FOR TRANSMITTING DATA AMONG SUBSCRIBER STATIONS OF A BUS SYSTEM

FIELD OF THE INVENTION

The present invention relates to a method for transmitting data among subscriber stations of a bus system over a first channel of the bus system that is jointly used by a plurality of subscriber stations. The present invention also relates to a subscriber station of a bus system having a first control element for controlling an access by the subscriber station to a first channel of the bus system jointly used by a plurality of subscriber stations.

BACKGROUND INFORMATION

The "Controller Area Network" (CAN), as well as an extension of the CAN, referred to as a "Time Triggered CAN" (TTCAN), are known, for example, from German Published Patent Application No. 100 00 305. The media access control method used by the CAN is based on a bitwise arbitration. Bitwise arbitration allows a plurality of subscriber stations to simultaneously transmit data over the channel of the bus system, without any interference to the data transmission in the process. In addition, when transmitting a bit over the channel, the subscriber stations can determine the logic state (0 or 1) of the channel. If a value of the transmitted bit does not correspond to the ascertained logic state of the channel, the subscriber station then terminates the access to the channel. In the case of the CAN, the bitwise arbitration is usually performed in an arbitration field within a data frame to be transmitted over the channel. Once a subscriber station has completed transmission of the arbitration field to the channel, it knows that it has exclusive access to the channel. Thus, the end of the arbitration field transmission corresponds to a beginning of an enable interval during which the subscriber station has exclusive use of the channel. In accordance with the protocol specification of the CAN, other subscriber stations are not permitted to access the channel, i.e., transmit data to the channel, until the transmitting subscriber station has transmitted a checksum (CRC field) of the data frame. Thus, an end time point of transmission of the CRC field corresponds to an end of the enable interval.

A nondestructive transmission of the data frame over the channel is accomplished by the bitwise arbitration. Good real-time properties of the CAN are thereby obtained, whereas media access control methods where the data frame transmitted by a subscriber station can be destroyed during the transmission over the channel due to a collision with another data frame transmitted by a different station, are characterized by a distinctly less favorable real-time behavior since the collision and the thereby necessitated re-transmission of the data frame delay the data transmission.

A further improvement in the real-time behavior of the CAN is attained by the TTCAN extension. In accordance with the TTCAN protocol specification, a time window structure is defined which includes a plurality of successive time windows (often referred to as time slots) and which is regularly repeated. In this context, a specific message type and thus a specific subscriber station can have a specific time window assigned thereto, during which messages of this message type can be transmitted. Thus, in the case of the TTCAN, predetermined time windows are provided during which a specific station has exclusive access to the channel of a CAN domain. In the case of the TTCAN, the access to the channel is at least partially coordinated in accordance with the time based multiple access (Time Division Multiple Access, TDMA) principle.

The protocols of the CAN, respectively of the TTCAN extension thereof, are particularly suited for transmitting short messages under real-time conditions. However, if larger data blocks need to be transmitted over a CAN domain, then the relatively low bit rate of the channel is perceived as interference. To ensure the correct functioning of the bitwise arbitration, a bit transmission requires that a minimum duration be observed that is dependent, in particular, on the extent of the bus system and the signal propagation speed on the channel. Thus, the bit rate cannot be readily increased by reducing the duration of the individual bits.

To nevertheless be able to rapidly transmit a relatively large data block required for programming a control unit via a communication interface actually provided for the connection to a CAN domain, German Published Patent Application 101 53 085 discusses temporarily switching the communication interface for transmitting the data block to a different communication mode in which no bitwise arbitration is performed, so that a relatively high bit rate is possible. In this case, however, it is necessary to interrupt the communication with the CAN protocols for a certain time period. For example, if it is no longer possible to begin the bus system operation in accordance with the CAN protocols due to an error, then the result is bus system failure. Moreover, transmitting a relatively large data block causes a considerable delay in the subsequent transmissions to be undertaken in accordance with the CAN protocols, thereby degrading the real-time properties of the CAN. Thus, using this method to not only program the control unit at the end of a production process for a motor vehicle or the control unit, but also during operation of the motor vehicle, is impractical.

SUMMARY

Example embodiments of the present invention provide a method for a subscriber station of a bus system to access a second channel of a bus system in parallel to the first channel jointly used by a plurality of subscriber stations, where large quantities of data will be able to be transmitted relatively quickly, and real-time conditions will be able to be observed during transmission of the messages over the bus.

The realization of the method according to example embodiments of the present invention provides for a high-frequency (HF) communication to be implemented over any given bus system, such as a CAN bus, using any given access protocol. Any given access method may be employed to control access to the second channel used by a plurality of subscriber stations for HF communication. First data to be transmitted over the first channel and second data to be transmitted over the second channel are transmitted over a shared signal line. Thus, it suffices to provide one single signal line, for example in the form of a shared bus line, among the individual subscriber stations. It is possible that it be a bus line of the known bus system, in particular of the CAN, over which the data of the first channel are transmitted in accordance with the CAN protocols. Here, the advantage is derived that conventional subscriber stations, which control the known CAN protocols, for example, may be readily connected to the bus system that is operated using the method according to the present invention. In this respect, the method provided here relates to a CAN protocol extension that is compatible to the known protocols and devices of the CAN.

In this case, it is preferred that a data signal and a signal modulated by the second data be generated as a function of the first data, and that the modulated signal be superimposed on the data signal. This prevents the simultaneously occurring transmission of the second data over the second channel from interfering with the transmission of the first data over the second channel. A frequency modulation, in particular a frequency shift keying may be used as a modulation method for producing the modulated signal as a function of a logic state (0 or 1) of the second channel. It is also possible to provide a phase modulation, for example a binary phase modulation (Binary Phase Shift Keying, BPSK).

One especially preferred example embodiment provides that the bitwise arbitration, which limits a bit rate of the first channel, be used to control the access to the first channel, whereas no special arbitration is needed for the second channel. A subscriber station has exclusive access to the first channel during the enable interval, and it accesses the second channel only if it has exclusive access to the first channel. Thus, the second channel may feature a considerably higher bit rate than the first channel. The subscriber station is able to transmit a relatively large data block over the second channel while it has exclusive access to the first channel. The bus system preferably has a CAN domain.

Moreover, it is especially preferred that a time window or a portion thereof be predefined as the at least one enable interval within a regularly repeating time window structure. For the case that the bus system has a CAN domain, the enable interval, respectively the time window is preferably predefined by the TTCAN protocols. In this connection, the time window may be a segment of a basic cycle that is repeated several times within one total cycle. Since, in the case of the TTCAN, a time window is usually assigned to one specific message type, one single subscriber station often has a plurality of time windows and, thus, a plurality of enable intervals within the time window structure preassigned thereto. This is especially the case when this subscriber station is responsible for sending different types of messages, i.e., when it constitutes an information source for a plurality of message types. Using the TTCAN not only makes it possible to ensure an interference-free communication among a plurality of subscriber stations over the second channel without thereby requiring a special arbitration method for the second channel, but allows a specific proportion of the capacity of the second channel to be allocated to individual subscriber stations. Thus, a specific average bit rate may be hereby predefined or assured for transmissions between two specific subscriber stations for transmissions of specific types of messages.

Alternatively or additionally, it may also be provided for a beginning of the enable interval to be ascertained by the subscriber station by a bitwise arbitration of the first channel, and for an end of the enable interval to be specified as soon as the subscriber station re-enables it following a successful arbitration of the first channel. It is thereby accomplished that the access to the second channel is controlled by the bitwise arbitration provided for the first channel. In the case of a CAN domain, it may be provided that the beginning of the enable interval correspond to the end of the transmission of an arbitration field of a frame, and that the end of the enable interval correspond to an end of the transmission of a checksum field of this frame (CRC field).

Using a suitable access method, it is ensured during operation of the bus system that the data to be transmitted over the second channel are not destroyed by collisions thereon. The subscriber station features a second control element for controlling the access to the second channel. The second control element may be any type of communications controller that is not required to execute any protocol for controlling the access to the second channel. The communications controller may be simply realized as a controller for transmitting and receiving an asynchronous serial data stream. The subscriber station features a coupling element which connects the two control elements to a shared signal line in such a way that the first data and the second data are transmissible over the shared signal line between different subscriber stations. This makes possible a simple wire routing among the subscriber stations of the bus system.

Any given media access control method or protocol may be provided to prevent the data to be transmitted over the second channel from being destroyed by a collision on the second channel. However, it is preferable that the access to the second channel be controlled in a way that allows the second channel to be enabled only within the enable interval of the first channel for access by the subscriber station. Every subscriber station that is linked to the bus system is thereby able to ensure that no more than one subscriber station accesses the second channel at any point in time. The subscriber station may be an electronic component of a motor vehicle, for example, in particular, a control unit of a motor vehicle.

To be able to coordinate the access to the second channel without using a separate media access control method or protocol, it is especially preferred that the second control element be coupled to the first control element in a way that makes the second control element controllable, preferably by an access control signal generated by the first control element, to enable the access to the second channel. It may be provided here for the first control element to feature an output for outputting the access control signal, and for the second control element to feature a corresponding control input for communicating with the output.

The subscriber station is preferably configured to implement the method as described herein in order to realize the advantages thereof.

Further features and advantages of example embodiments of the present invention are derived from the following description in which exemplary embodiments are explained in greater detail with reference to the drawing.

DETAILED DESCRIPTION

Figure 1:
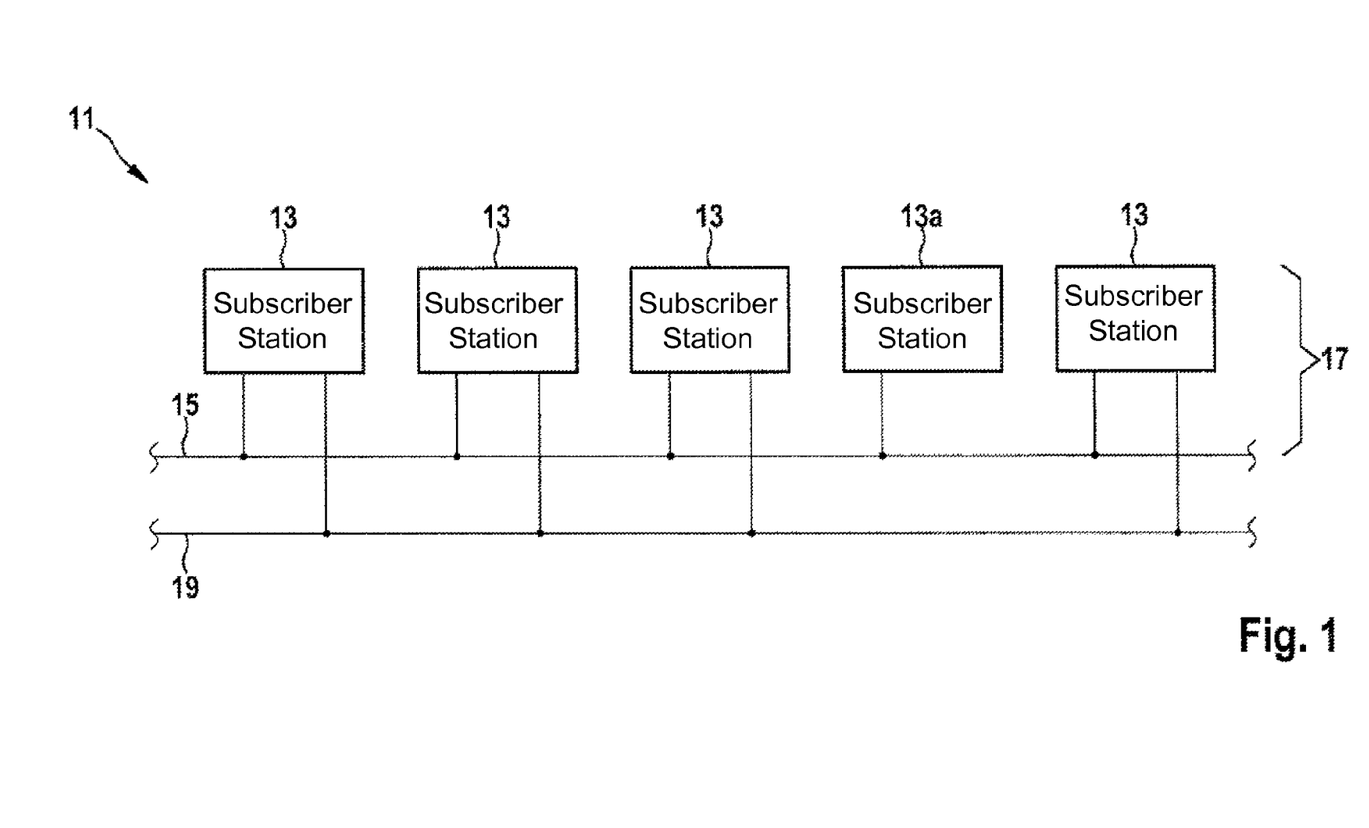
FIG. 1 shows a schematic representation of a bus system having a plurality of subscriber stations.

FIG. 1 shows an overview of a bus system 11 of a motor vehicle which encompasses a plurality of subscriber stations 13, 13a and a first channel 15 jointly used by these subscriber stations 13, 13a. In the illustrated exemplary embodiments, subscriber stations 13, 13a and first channel 15 make up a CAN domain 17. However, example embodiments of the present invention are not only applicable to the CAN, but also to other types of communications networks. In this context, it is beneficial, but not a necessary condition that a station's exclusive, collision-free access to a shared channel be ensured at least for certain time periods in the communications networks being used. Subscriber stations 13, 13a may, for example, be control units or display devices of the motor vehicle.

A portion of subscriber stations 13 is linked to a second channel 19 jointly used by this portion of subscriber stations 13. In the illustrated exemplary embodiment, all subscriber stations 13, except for subscriber station 13a, are linked to both channels 15, 19. This subscriber station 13a is a conventional subscriber station, which, in fact, controls the protocols of the CAN, but is not configured for implementing a method according to example embodiments of the present invention. In accordance with example embodiments of the present invention, the other subscriber stations 13 are expanded to include additional functions, allowing them to additionally communicate over second channel 19. Thus, in the case of bus system 11 shown in FIG. 1, conventional subscriber stations 13a and expanded subscriber stations 13 may be interconnected. A plurality of conventional subscriber stations 13a may also be provided in the bus system; however, it is also possible in bus system 11 for merely expanded subscriber stations 13 to be provided that are linked to both channels 15, 19.

Example embodiments of the present invention are clarified in the following with reference to a media access control method, respectively protocol used in the CAN bus. However, it is self-evident that example embodiments of the present invention is not restricted to such access methods, but rather may be carried out using any given media access control methods and protocols.

Figure 2:
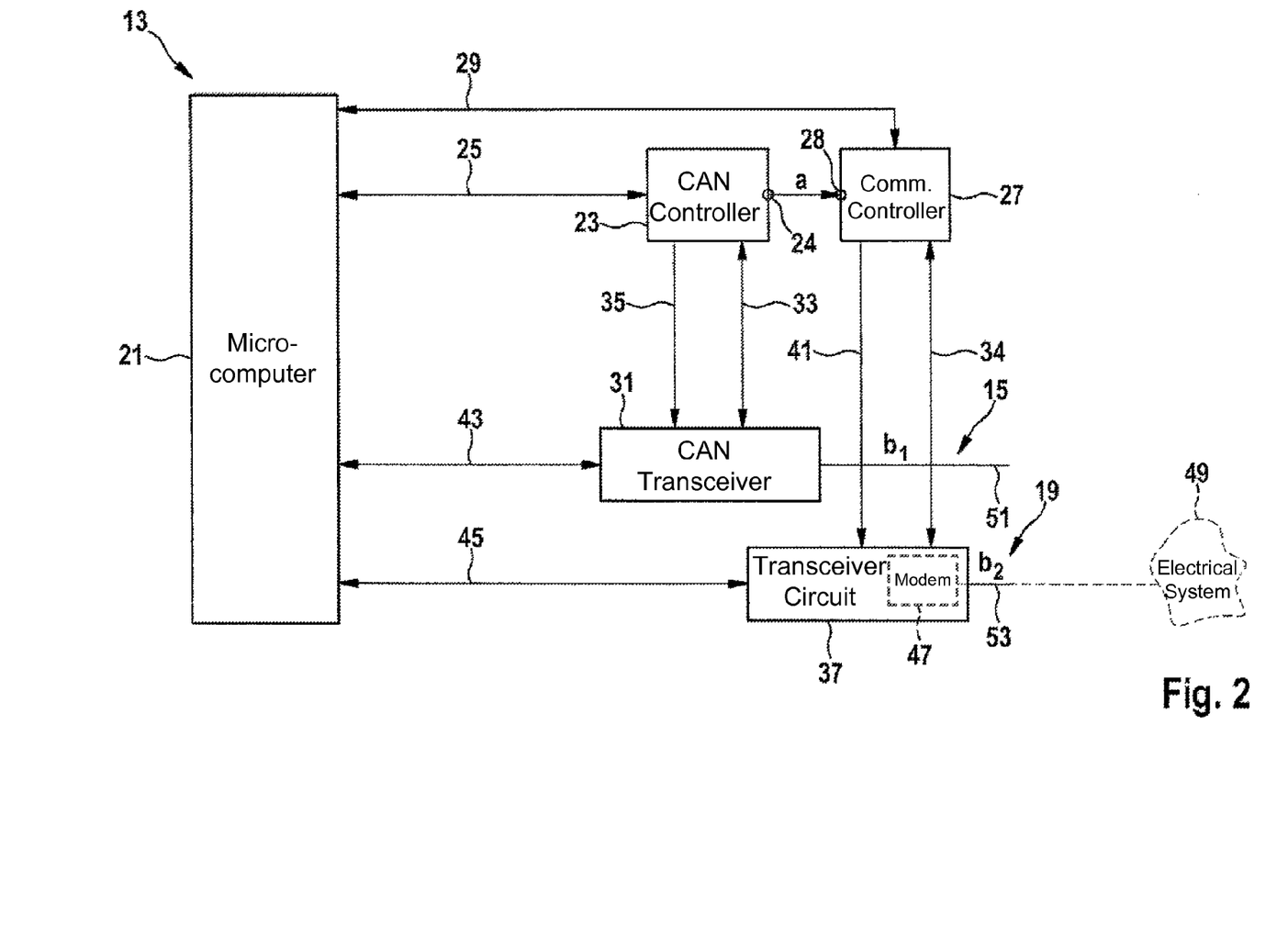
FIG. 2 shows a schematic representation of one of the subscriber stations from FIG. 1.

FIG. 2 shows an expanded subscriber station 13 in detail. This subscriber station 13 features a microcomputer 21 which may be configured as a microcontroller, for example. A first control element of the subscriber station in the form of a CAN controller 23 is linked via a first coupling device 25 to microcomputer 21. Moreover, subscriber station 13 features a second control element in the form of a communications controller 27 which is connected via a second coupling device 29 to microcomputer 21. The two coupling devices 25, 29 are configured for exchanging data to be transmitted via bus system 11, as well as configuration, control and status information among microcomputer 21 and the two control elements 23, 27. Communications controller 27 is coupled to CAN controller 23 in a way that allows CAN controller to control communications controller 27 via an access control signal a generated by the same. For this purpose, a control input 28 of communications controller 27 is linked to a control output 24 of CAN controller 23.

Moreover, a subscriber station 13 features a first transceiver circuit which is configured as a CAN transceiver 31. CAN transceiver 31 communicates with CAN controller 23 in a way that allows the exchange (arrow 33) of first data to be transmitted via CAN domain 17, i.e., first channel 15, between CAN controller 23 and CAN transceiver 31. Moreover, CAN transceiver 31 is linked to CAN controller 23 in a way that allows CAN controller 23 to transmit control signals to CAN transceiver 31 (arrow 35). CAN transceiver 31 is linked to first channel 15.

In addition, subscriber station 13 features a second transceiver circuit 37 which communicates with communications controller 27 for transmitting first data (arrow 39) to be exchanged via CAN domain 17, as well as for transmitting control signals (arrow 41) between communications controller 27 and second transceiver circuit 37. Second transceiver circuit 37 is linked to second channel 19.

Moreover, the two transceiver circuits 31, 37 may be connected to microcomputer 21, thereby allowing microcomputer 21 to control the two transceiver circuits 31, 37 and to read out status information therefrom (see arrows 43 and 45).

Such a connection of microcomputer 21 to transceiver circuits 31, 37 is optional, however. Example embodiments of the present invention may also be realized without such a connection.

Inherent in the precise design of communications controller 27 and second transceiver circuit 37 are considerable degrees of freedom. It is merely necessary that communications controller 27 and second transceiver circuit 37 be provided with a transmitting device for transmitting second data among expanded subscriber stations 13. A protocol for controlling the media access to the second channel (Media Access Control Protocol, MAC protocol) does not necessarily need to be executed over second channel 19. In the case of the specific embodiment shown here, communications controller 27 is configured for transmitting and receiving an asynchronous serial data stream. A transceiver circuit, which is actually provided for the CAN, may be used as second transceiver circuit 37, for example. Since there is no need to perform any bitwise arbitration over second channel 19, nor therefore any bitwise arbitration of the CAN, second transceiver circuit 37 may be operated at a bit rate higher than that which is permissible for the operation of the second transceiver circuit in accordance with the CAN protocols. If the two transceiver circuits 31, 37 are identically designed as CAN transceivers, second channel 19 may then be operated at a higher bit rate than first channel 15. The bit rate of second channel 19 may be 3 to 4 Mbit/s, for example.

If an even higher bit rate is to be provided for data transmissions over second channel 19, then a transceiver circuit for the "FlexRay" communications system or for local computer networks, such as "Ethernets," for example, may be used as second transceiver circuit 37. A bit rate of 10 Mbit/s or 100 Mbit/s may be hereby realized on second channel 19, for example. Second channel 19 may be designed as an electrical and/or optical connection between second transceiver circuits 37 of subscriber stations 13.

In addition, the second channel may also be constituted of an electrical system 49 of a motor vehicle in which bus system 11 is installed ("Powerline Communications," PLC). In this case, second transceiver circuit 37 features a PLC modem 47 that is coupled to electrical system 49 of the motor vehicle for transmitting the second data over electrical system 49.

In the exemplary embodiment shown in FIG. 2, first channel 15 is constituted of a first signal line 51. Second channel 19 is composed of second signal line 53 that is separate from first signal line 51. In this respect, the exemplary embodiment illustrated in FIG. 2 is not included in the subject matter of the claims, since, in accordance with example embodiments of the present invention, first channel 15 and second channel 19 are formed by a shared signal line 55 (compare FIG. 3). Except for this distinction from the present invention, the explanations pertaining to the exemplary embodiment from FIG. 2 also apply to example embodiments of the present invention, however.

For example, in the case of first signal line 51, it is a question of a two-wire line commonly used in CANs for the differential transmission of first data (depicted in FIG. 2 as first bitstream $b_1$) to be transmitted over first channel 15.

Second signal line 53 is configured for transmitting data to be transmitted over second channel 19, i.e., for transmitting a second bitstream $b_2$. Second signal line 53 may have the form of another two-wire line used for the differential transmission of second data $b_2$, respectively of second bitstream $b_2$, or have some other type of configuration.

Figure 3:
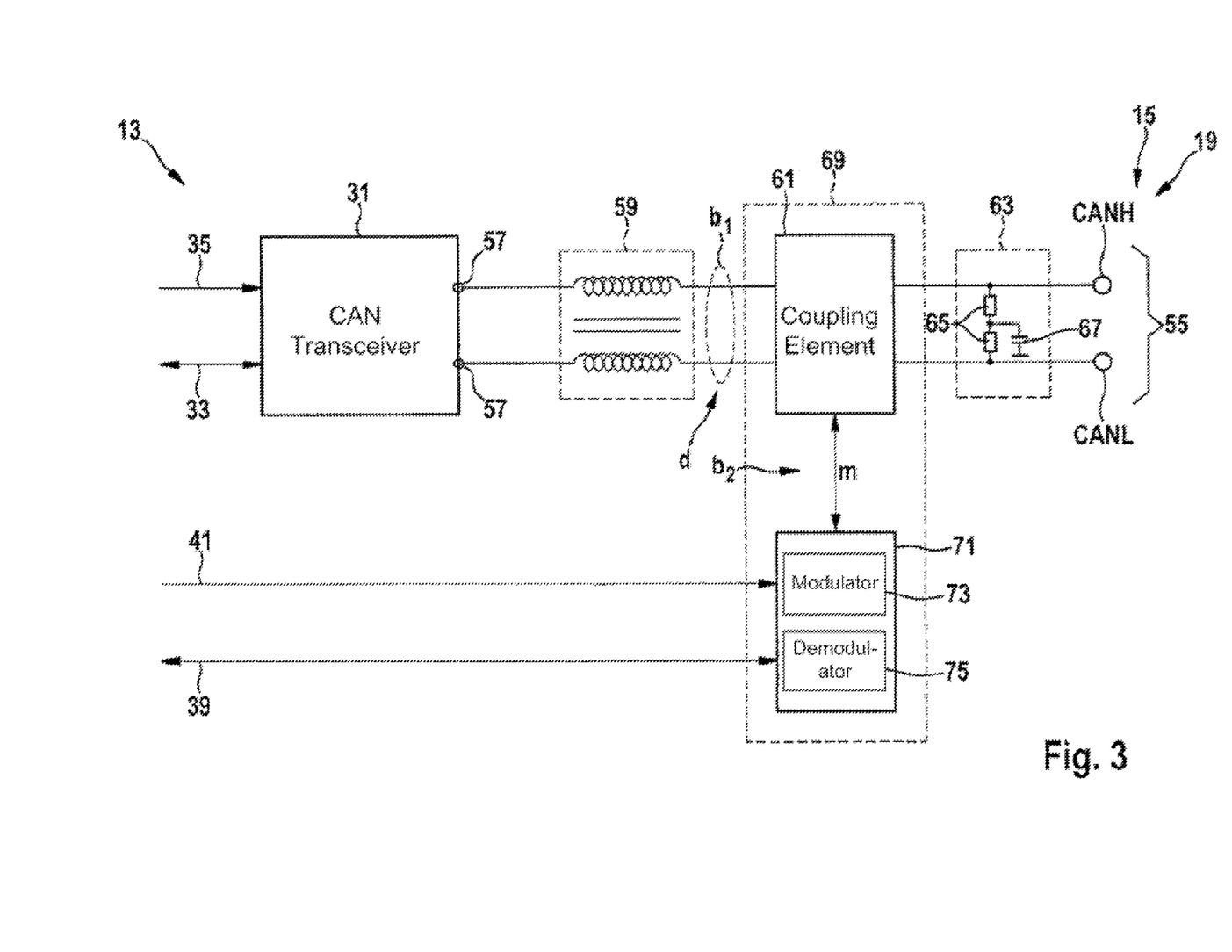
FIG. 3 is a schematic representation of a section of a subscriber station from FIG. 1 in accordance with an example embodiment of the present invention.

FIG. 3 illustrates an example embodiment of the present invention where a shared signal line 55 is provided for the two channels 15, 19. Shared signal line 55 encompasses a wire pair composed of a first wire CANH and a second wire CANL. In the illustrated example embodiment, shared signal line 55 is a conventional bus line suited for a CAN-based bus system.

As is apparent from FIG. 3, CAN transceiver 31 is also present in the case of a subscriber station 13 designed for connection to shared signal line 55. It is connected via lines 33, 35 to CAN controller 23. A common-mode choke 59 is configured at two bus connections 57 of CAN transceiver 31. Located between common-mode choke 59 and wire pair CANH, CANL of shared signal line 55 is a coupling element 61. Coupling element 61 may also be combined with common-mode choke 59 to enable high-frequency signals to be inductively coupled in and out, and the high-frequency section of subscriber 13 to be galvanically decoupled from CAN bus 55. Configured moreover between first wire CANH and second wire CANL is a bus-termination circuit 63 which features two series connected terminal resistors 65, the outer ends of this series circuit being connected to wires CANH, CANL, and a center tap of this series circuit being connected via a capacitor 67 to ground. In one specific embodiment (not shown), common-mode choke 59 and/or bus-termination circuit 63 are not provided.

Coupling element 61 belongs to a connection circuit 69 of subscriber station 13 that, in the specific embodiment shown in FIG. 3, is provided instead of second transceiver circuit 37. On the one hand, a modem 71 of connection circuit 69 may be connected to microcomputer 21; on the other hand, it is linked to coupling element 61. Modem 71 features a modulator 73 for producing a signal m that is modulated as a function of second bitstream $b_2$. In addition, modem 71 features a demodulator 75 for demodulating modulated signal m that has been transmitted by another subscriber station 13 over shared signal line 55.

Figure 4:
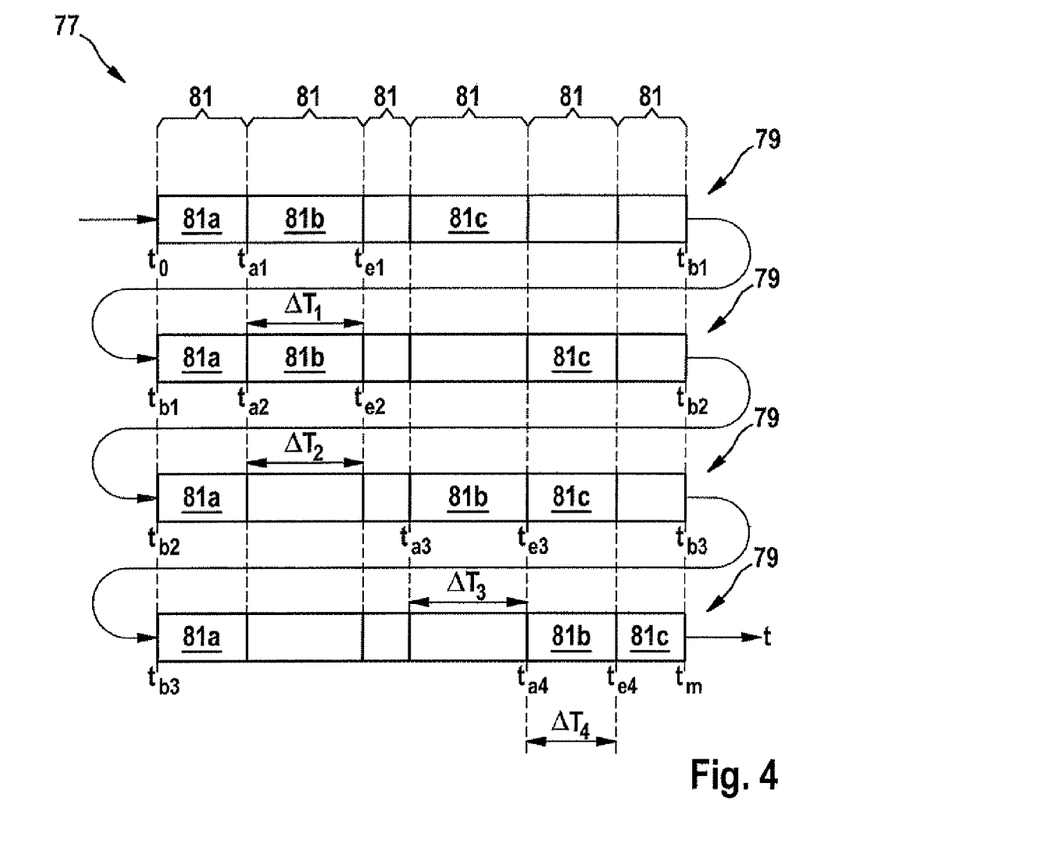
FIG. 4 illustrates a time characteristic of an allocation of a bus system channel.
Figure 5:
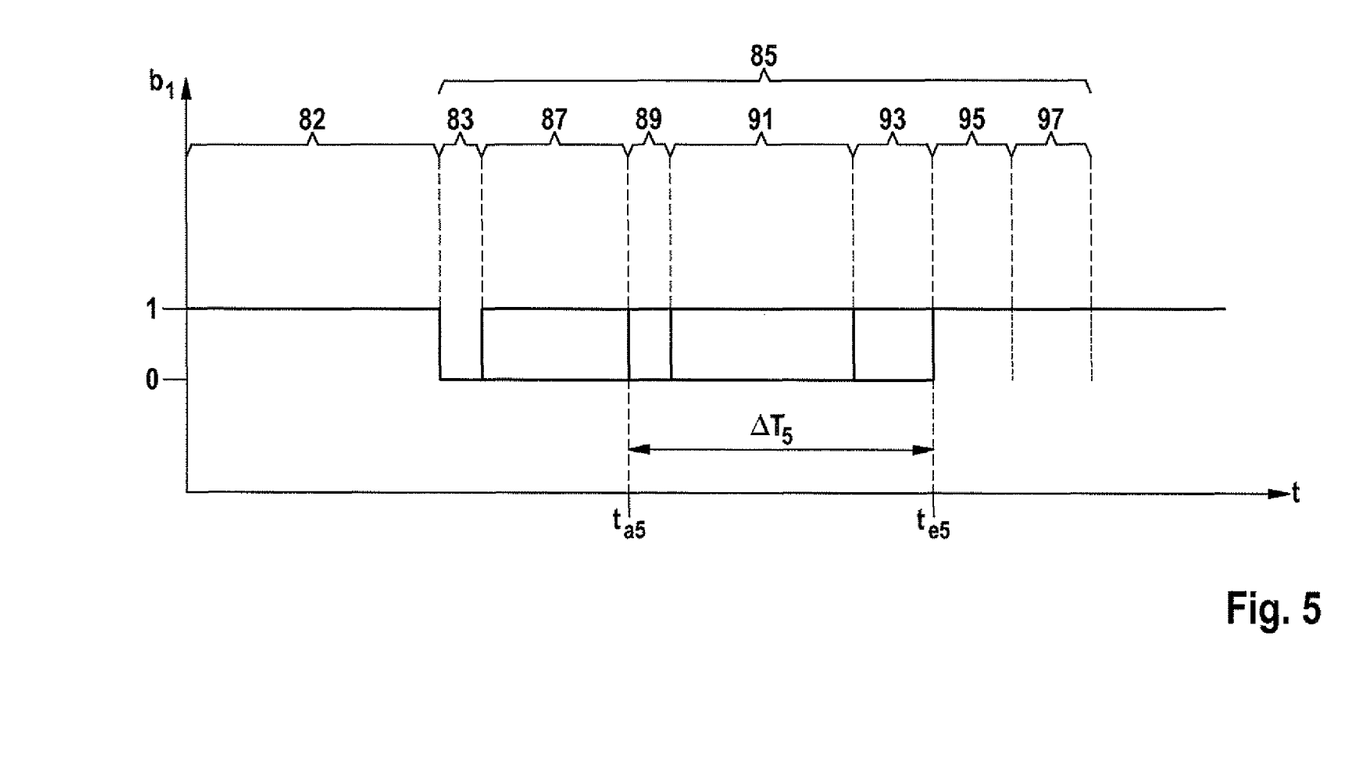
FIG. 5 shows a time characteristic of the channel allocation during transmission of a frame over the channel.

In the following, the operating principle of subscriber stations 13 and of bus system 11 are clarified in greater detail with reference to FIG. 4 in 5. During operation of bus system 11, microcomputers 21 of individual subscriber stations 13 control individual CAN controllers 23 and CAN transceivers 31, thereby allowing messages to be exchanged between subscriber stations 13, 13a in accordance with the CAN protocols, in that frames containing the messages are transmitted over first channel 15.

In the illustrated example embodiment, individual subscriber stations 13 support the TTCAN extension. In accordance with the TTCAN, the time is subdivided into regularly repeating total cycles. Such a total cycle 77 is shown schematically in FIG. 4. Total cycle 77 begins at time point $t_0$ and ends at time point $t_m$. It is discernible that total cycle 77, in turn, is subdivided into a plurality of basic cycles 79. In the illustrated example embodiment, total cycle 77 is subdivided into four basic cycles 79. First basic cycle 79 (drawn at the top in FIG. 4) begins at time point $t_0$ and ends at time point $t_{b1}$. Second basic cycle 79, which follows first basic cycle 79, also begins at this time point $t_{b1}$ and ends at a time point $t_{b2}$. Correspondingly, third basic cycle begins at time point $t_{b2}$ and ends at time point $t_{b3}$. Fourth basic cycle begins at time point $t_{b3}$ and ends at time point $t_m$ and thus ends total cycle 77.

Individual basic cycles 79 are subdivided into a plurality of, in the illustrated example embodiment six, time windows 81, the subdivision of basic cycles 79 into time windows 81 being identical for each basic cycle 79. Total cycles 77 define a regularly repeating time window structure which, due to the identical subdivision of individual basic cycles 79 into time windows 81, features a matrix-type structure and, thus, is usually referred to as a communications matrix.

A first time window 81a is provided for transmitting reference messages over first channel 15. The reference messages are used, in particular, for synchronizing individual subscriber stations 13 among themselves, so that, from the perspective of individual subscriber stations 13, the temporal position of individual time windows 81 is at least substantially identical. A portion of time windows 81 is assigned to a specific message type, i.e., within this time window 81, exclusively data frames having a specific identifier are transmitted. For example, it may be provided that time windows 81 denoted by 81b are reserved for transmitting the message of the specific type.

Since, in the case of the CAN, a message of a specific type, i.e., having a specific identifier, may only be generated by a subscriber station 13, time windows 81b are exclusively assigned to this subscriber station 13. This means that at a beginning time point $t_{a1}$, $t_{a2}$, $t_{a3}$, respectively $t_{a4}$, an enable interval $\Delta T_1$, $\Delta T_2$, $\Delta T_3$, respectively $\Delta T_4$ begins within which these subscriber stations 13 have exclusive access to first channel 15. Enable interval $\Delta T_1$, $\Delta T_2$, $\Delta T_3$, respectively $\Delta T_4$ ends in each case at the end of corresponding time window 81b, i.e., at time point $t_{e1}$, $t_{e2}$, $t_{e3}$, respectively $t_{e4}$. In the illustrated specific embodiment, enable interval $\Delta T_1$, $\Delta T_2$, $\Delta T_3$, respectively $\Delta T_4$ corresponds to particular time window 81b of the total cycle. Deviating herefrom, it may also be provided, however, that enable interval $\Delta T_1$, $\Delta T_2$, $\Delta T_3$, respectively $\Delta T_4$ merely correspond to a portion of particular time window 81b. Important for the functioning of the method according to example embodiments of the present invention is that enable interval $\Delta T_1$, $\Delta T_2$, $\Delta T_3$, respectively $\Delta T_4$ be completely covered with respect to time by a time window 81b or by a plurality of directly successive time windows 81b.

Each subscriber station 13 records time points $t_0$, $t_{b1}$, $t_{b2}$, $t_{b3}$ when the individual reference messages are received and calculates the temporal position of at least those time windows 81 within which it intends to access the bus. Subscriber station 13, which is responsible for sending those messages to which time window 81b is assigned, calculates the position of enable interval $\Delta T_1$, $\Delta T_2$, $\Delta T_3$, respectively $\Delta T_4$ drawn in FIG. 4. In the illustrated example embodiment, CAN controller 23 performs these calculations. It may also be provided, however, for these calculations to be performed by microcomputer 21. In addition, CAN controller 23 generates access control signal a and transmits it to communications controller 27 (see FIG. 2). Access control signal a is always active within enable interval $\Delta T_1$, $\Delta T_2$, $\Delta T_3$, respectively $\Delta T_4$. Communications controller 27 evaluates access control signal a and only accesses second channel 19 when access control signal a is active. If access control signal a is not active, then communications controller 27 keeps second channel 19 free, thereby allowing other subscriber stations 13 to access it. Thus, subscriber stations 13 are configured to allow CAN controller 23 to control communications controller 27 as a function of access control method executed in the CAN domain in such a way that communications controller 27 accesses second channel 19 only when an access to first channel 15 is also permitted in accordance with media access control method of CAN domain 17.

In addition, within total cycle 77, other time windows 81c are provided within which messages of any given type may be transmitted. Exclusive access of a specific station to the first channel is not ensured within these time windows 81c. For that reason, a bitwise arbitration is performed within time windows 81c in accordance with the protocols of the CAN. The bitwise arbitration is based on the fact that a bit having one specific value is always received by all stations when a plurality of subscriber stations 13 simultaneously access first channel 15 and transmit bits having different values. The value of this bit is referred to as "dominant bit" and, in the illustrated example, corresponds to the value 0. In addition, first signal line 51 is configured to allow each subscriber station 13 to receive via its CAN transceiver 31 while it accesses first channel 15. Thus, while accessing first channel 15 in order to transmit a bit, each subscriber station 13 is able to read the momentary state of first channel 15 in order to ascertain whether this state corresponds to the transmitted bit.

FIG. 5 shows a detail of a time characteristic of the logic state (value 0 or 1) of first channel 15 within time window 81c. Following an open-circuit time 82 during which first channel 15 was not assigned by a subscriber station 13, a subscriber station 13 under consideration begins to transmit a start bit 83 of a frame 85. Following transmission of start bit 83, subscriber station 13 transmits an arbitration field 87 which, in particular, contains the identifier of the message that indicates the type of message. During the transmission of arbitration field 87, subscriber station 13 compares the logic state of first channel 15 to the particular transmitted bit of arbitration field 87. If, during the transmission of arbitration field 87, subscriber station 13 determines that the detected state of the first channel does not correspond to the transmitted bit, then subscriber station 13 terminates the transmission of frame 85. It is thus ensured that, following transmission of arbitration field 87 at a time point $t_{a5}$, a subscriber station 13 has exclusive access to first channel 15. All other stations, which have simultaneous access to first channel 15 in order to transmit a frame 85, have terminated their transmission and thus their access to first channel 15 at time point $t_{a5}$. Thus, time point $t_{a5}$ corresponds to the beginning of another enable interval $\Delta T_5$. Once arbitration field 87 has been transmitted, subscriber station 13 transmits a control field 89 of frame 85, a data field 91 of frame 85, as well as a check field 93 (what is generally referred to as a CRC field).

In an acknowledgement field 95 that follows check field 93, other subscriber stations 13 may transmit an acknowledgement bit over first channel 15, i.e., access first channel 15. Thus, enable interval $\Delta T_5$, within which subscriber station 13 under consideration has exclusive access to first channel 15, ends at the end of the transmission of check field 93, i.e., at a time point $t_{e5}$. Acknowledgement field 95 is followed by a field having stop bits 97. Deviating from the illustrated specific embodiment, enable interval may also be selected to be shorter; however, it must reside within interval $\Delta T_5$ in which subscriber station 13 has exclusive access to first channel 15.

During time windows 81c, CAN controller 23 ensures that access control signal a is only active during enable interval $\Delta T_5$, so that, within time window 81c, communications controller 27 only accesses second channel 19 during enable interval $\Delta T_5$.

Deviating from the illustrated specific embodiment, it may also be provided that CAN controller 23 releases enable signal a for enabling the access to second channel 19 only within such time window 81 that enables transmission of messages of a certain type, i.e., within time window 81b, for example, while those time windows (for example, time windows 81c), which are used for transmitting messages of a different type, i.e., within which the bitwise arbitration takes place, are not used in this specific embodiment of second channel 19. It is also conceivable that an access to second channel during interval $\Delta T_5$ is only enabled when TTCAN is not available due to an error in CAN domain 17, for example. This makes possible an emergency operation of bus system 11, in particular of second channel 19 given a TTCAN that is not available, i.e., in the case of a missing time window structure 77.

In addition, it may be provided that the present invention be used on a CAN domain 17 that does not support the TTCAN extension. In the case of such a CAN domain 17, time window structure 77 is missing. Thus, a bitwise arbitration always takes place in such a case. In the case of such a CAN domain 17, the access to second channel 19 is enabled during enable interval $\Delta T_5$ indicated in FIG. 5.

If access control signal a is active, i.e., the access to second channel 19 is enabled, then, in the case of the specific embodiment illustrated in FIG. 2, second transceiver circuit 37 outputs second bitstream $b_2$. If second signal line 53 is constituted of electrical system 49, then, in the case of transmitting subscriber station 13, PLC modem 47 modulates bitstream $b_2$ and transmits a correspondingly modulated signal to electrical system 49. In the case of receiving subscriber stations 13, PLC modem 47 demodulates the modulated signal emitted by a transmitting subscriber station 13 and thereby reconstructs transmitted bitstream $b_2$ and relays the second data contained in second bitstream $b_2$ to communications controller 27.

In the example embodiment illustrated in FIG. 3, modulator 73 of modem 71 of transmitting subscriber station 13 produces modulated signal m as a function of second data $b_2$ that communications controller 27 had communicated to connection circuit 69. Coupling element 61 superimposes a signal m, that has been modulated as a function of second bitstream $b_2$, on data signal d generated by CAN transceiver 31 as a function of first bitstream $b_1$ and outputs it to both CANH and CANL wires of shared signal line 55. In the case of receiving subscriber stations 13, coupling element 61 relays a signal, which is received via the two wires CANH and CANL, over optionally present common-mode choke 59 to CAN transceiver 31 and transmits it to demodulator 75 of modem 71. From the received signal, CAN transceiver 31 extracts first bitstream $b_1$ and relays it to CAN controller 23. Correspondingly, demodulator 75 ascertains second bitstream $b_2$ from the received signal. By configuring optionally present common-mode choke 59 between CAN transceiver 31 and coupling element 61, common-mode choke 59 is prevented from attenuating modulated signal m within a signal path between modem 71 of two subscriber stations linked to shared signal line 55.

As a modulation method in the illustrated example embodiment, modem 71 employs a frequency shift keying as a function of the value of the individual temporally successive bits of second bitstream $b_2$. Deviating herefrom, in place of the frequency shift keying, a phase modulation or any other modulation method may also be used.

In the simplest case, coupling element 61 may also be configured as a resistor network. However, coupling element 61 may also feature one or a plurality of filters for separating data signal d to be fed to CAN transceiver 31 from modulated signal m. Moreover, it would be conceivable for coupling element 61 to be combined with common-mode choke 59; thus, instead of a simple inductor having four connections, for common-mode choke 59 to use an inductor having six or more connections. In this manner, high-frequency signal may be inductively coupled in and out; and the high-frequency section is galvanically decoupled from the CAN bus. Moreover, cost advantages are thereby derived.

Overall, therefore, example embodiments of the present invention provide a method and a subscriber station 13 which make it possible to substantially increase the useful bit rate of CAN domain 17 using additional, second channel 19, thereby enabling larger data blocks to be readily transmitted over bus system 11. Since the access to second channel 19 may be controlled as a function of the media access control of CAN domain 17, it is possible to prevent collisions, i.e., inference caused by a plurality of subscriber stations 13 unintentionally accessing second channel 19 simultaneously. Therefore, a bus system 11 is obtained that is able to satisfy the real-time conditions that arise in automotive technology, render possible transmissions at relatively high bit rates and, nevertheless, be realized at low cost.

What is claimed is:

1. A method for transmitting data among subscriber stations of a bus system over a first channel of the bus system that is jointly used by a plurality of subscriber stations, comprising:
    besides over the first channel, transmitting data over a second channel that is used by the plurality of subscriber stations;
    controlling access to the second channel by an access method; and
    transmitting first data to be transmitted over the first channel and second data to be transmitted over the second channel over a shared signal line;
    wherein:
        the transmitting of the first data includes generating a data signal as a function of the first data, generating a modulated signal as a function of the second data, superimposing the modulated signal on the data signal, and transmitting the superimposed signals over the shared signal line;
        the access to the second channel by any particular subscriber station is controlled in a manner that allows the second channel to only be enabled for the particular subscriber station within an enable interval;
        the enable interval is an interval during which the particular subscriber station has exclusive access to the first channel;
        a beginning of the enable interval is ascertained by the subscriber station by a bitwise arbitration of the first channel; and
        an end of the enable interval is specified as soon as the subscriber station re-enables the first channel following a successful arbitration of the first channel.

2. The method according to claim 1, wherein a time window or a portion thereof is predefined as the at least one enable interval within a regularly repeating time window structure.

3. A subscriber station of a bus system, comprising:
    first processing circuitry adapted to control an access by the subscriber station to a first channel of the bus system jointly used by a plurality of subscriber stations;
    second processing circuitry adapted to control an access of the subscriber station to a second channel used by the plurality of subscriber stations, in accordance with an access method; and
    a coupling element which connects the first processing circuitry and the second processing circuitry to a shared signal line such that first data to be transmitted over the first channel and second data to be transmitted over the second channel are transmissible over the shared signal line among different subscriber stations;
    wherein:
        the subscriber station is configured to generate a data signal as a function of the first data, generate a modulated signal as a function of the second data, superimpose the modulated signal on the data signal, and transmit the superimposed signals over the shared signal line;
        the access to the second channel by the subscriber station is controlled in a manner that allows the second channel to only be enabled for the subscriber station within an enable interval;
        the enable interval is an interval during which the subscriber station has exclusive access to the first channel;
        a beginning of the enable interval is ascertained by the subscriber station by a bitwise arbitration of the first channel; and
        an end of the enable interval is specified as soon as the subscriber station re-enables the first channel following a successful arbitration of the first channel.

4. A subscriber station of a bus system, comprising:
    first processing circuitry adapted to control an access by the subscriber station to a first channel of the bus system jointly used by a plurality of subscriber stations;
    second processing circuitry adapted to control an access of the subscriber station to a second channel used by the plurality of subscriber stations, in accordance with an access method; and
    a coupling element which connects the first processing circuitry and the second processing circuitry to a shared signal line such that first data to be transmitted over the first channel and second data to be transmitted over the second channel are transmissible over the shared signal line among different subscriber stations;
    wherein:
        the second processing circuitry is coupled to the first processing circuitry in a manner that makes the second processing circuitry controllable, by an access control signal generated by the first processing circuitry, to enable the access to the second channel;
        the coupling element is combined with a common mode choke in a manner that allows a high-frequency signal encompassing the first and the second data to be inductively coupled in and out;
        the first processing circuitry is configured for controlling an access of the subscriber station to the second channel in a manner that allows the second channel to only be enabled for the subscriber station within an enable interval; and
        the enable interval is an interval during which the subscriber station has exclusive access to the first channel.

5. The subscriber station according to claim 4, wherein a time window or a portion thereof is predefined as the at least one enable interval within a regularly repeating time window structure.

6. A subscriber station of a bus system, comprising:
    first processing circuitry adapted to control an access by the subscriber station to a first channel of the bus system jointly used by a plurality of subscriber stations;
    second processing circuitry adapted to control an access of the subscriber station to a second channel used by the plurality of subscriber stations, in accordance with an access method; and
    a coupling element which connects the first processing circuitry and the second processing circuitry to a shared signal line such that first data to be transmitted over the first channel and second data to be transmitted over the second channel are transmissible over the shared signal line among different subscriber stations;
    wherein:
        the subscriber station is configured to generate a data signal as a function of the first data, generate a modulated signal as a function of the second data, superimpose the modulated signal on the data signal, and transmit the superimposed signals over the shared signal line; and the first processing circuitry is configured for controlling an access of the subscriber station to the second channel in a manner that allows the second channel to only be enabled for the subscriber station within an enable interval, and the enable interval is an interval during which the subscriber station has exclusive access to the first channel.

7. A subscriber station of a bus system, comprising:

first processing circuitry adapted to control an access by the subscriber station to a first channel of the bus system jointly used by a plurality of subscriber stations;

second processing circuitry adapted to control an access of the subscriber station to a second channel used by the plurality of subscriber stations, in accordance with an access method; and a coupling element which connects the first processing circuitry and the second processing circuitry to a shared signal line such that first data to be transmitted over the first channel and second data to be transmitted over the second channel are transmissible over the shared signal line among different subscriber stations;

wherein:

the subscriber station is configured to generate a data signal as a function of the first data, generate a modulated signal as a function of the second data, superimpose the modulated signal on the data signal, and transmit the superimposed signals over the shared signal line; and the second processing circuitry is coupled to the first processing circuitry in a manner that makes the second processing circuitry controllable, by an access control signal generated by the first processing circuitry, to enable the access to the second channel by the subscriber station only within an enable interval, and the enable interval is an interval during which the subscriber station has exclusive access to the first channel.

8. A subscriber station of a bus system, comprising:

first processing circuitry adapted to control an access by the subscriber station to a first channel of the bus system jointly used by a plurality of subscriber stations;

second processing circuitry adapted to control an access of the subscriber station to a second channel used by a plurality of subscriber stations, in accordance with an access method; and a coupling element which connects the first and second processing circuitry to a shared signal line such that first data to be transmitted over the first channel and second data to be transmitted over the second channel are transmissible over the shared signal line among different subscriber stations;

wherein:

data is transmitted among the subscriber stations of the bus system over the first channel of the bus system that is jointly used by the plurality of subscriber stations;

besides over the first channel, data is transmitted over the second channel that is used by the plurality of subscriber stations;

access to the second channel is controlled by an access process;

first data is transmitted over the first channel and second data is transmitted over the second channel over the shared signal line; and the subscriber station is configured to:
 generate a data signal as a function of the first data;
 generate a modulated signal as a function of the second data;
 superimpose the modulated signal on the data signal; and
 transmit the superimposed signals over the shared signal line.

9. A subscriber station of a bus system, comprising:

first processing circuitry adapted to control an access by the subscriber station to a first channel of the bus system jointly used by a plurality of subscriber stations;

second processing circuitry adapted to control an access of the subscriber station to a second channel used by the plurality of subscriber stations, in accordance with an access method; and a coupling element which connects the first processing circuitry and the second processing circuitry to a shared signal line such that first data to be transmitted over the first channel and second data to be transmitted over the second channel are transmissible over the shared signal line among different subscriber stations;

wherein:

the coupling element is combined with a common mode choke in a manner that allows a high-frequency signal encompassing the first and the second data to be inductively coupled in and out;

the second processing circuitry is coupled to the first processing circuitry in a manner that makes the second processing circuitry controllable, by an access control signal generated by the first processing circuitry, to enable the access to the second channel;

the first processing circuitry is configured for controlling an access of the subscriber station to the second channel in a manner that allows the second channel to only be enabled for the subscriber station within an enable interval; and the enable interval is an interval during which the subscriber station has exclusive access to the first channel.

10. The subscriber station according to claim 9, wherein a time window or a portion thereof is predefined as the at least one enable interval within a regularly repeating time window structure.

* * * * *